(12) United States Patent
Bormann et al.

(10) Patent No.: US 6,748,548 B2
(45) Date of Patent: Jun. 8, 2004

(54) COMPUTER PERIPHERAL DEVICE THAT REMAINS OPERABLE WHEN CENTRAL PROCESSOR OPERATIONS ARE SUSPENDED

(75) Inventors: David Bormann, Sunnyvale, CA (US); Leslie E. Cline, Sunnyvale, CA (US); Frank Hart, Apex, NC (US); Siripong Sritanyarantana, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 514 days.

(21) Appl. No.: 09/752,627

(22) Filed: Dec. 29, 2000

(65) Prior Publication Data

US 2002/0124198 A1 Sep. 5, 2002

(51) Int. Cl.[7] .................................... G06F 1/26
(52) U.S. Cl. ................. 713/323; 713/300; 713/320; 713/323
(58) Field of Search ............... 713/300, 323, 713/320

(56) References Cited

U.S. PATENT DOCUMENTS

| | | | |
|---|---|---|---|
| 5,513,361 A | * 4/1996 | Young | 713/320 |
| 5,649,233 A | * 7/1997 | Chen | 710/8 |
| 5,671,368 A |   9/1997 | Chan et al. | |
| 5,761,725 A | * 6/1998 | Zeller et al. | 711/146 |
| 5,784,581 A | * 7/1998 | Hannah | 710/110 |
| 5,938,771 A | * 8/1999 | Williams et al. | 713/310 |
| 5,974,559 A | * 10/1999 | Bannai | 713/330 |
| 6,000,035 A | * 12/1999 | Matsushima et al. | 713/320 |
| 6,163,848 A | * 12/2000 | Gephardt et al. | 713/322 |
| 6,499,102 B1 | * 12/2002 | Ewertz | 713/1 |
| 6,560,712 B1 | * 5/2003 | Arends et al. | 713/320 |

FOREIGN PATENT DOCUMENTS

| | | | |
|---|---|---|---|
| EP | 0 565 319 A1 | * 10/1993 | G06F/1/32 |
| JP | 05282082 A | * 10/1993 | G06F/1/32 |

* cited by examiner

Primary Examiner—Dennis M. Butler
Assistant Examiner—Nitin C. Patel
(74) Attorney, Agent, or Firm—Blakely, Sokoloff, Taylor & Zafman LLP

(57) ABSTRACT

A peripheral device having a circuit to detect the power management state of a central processor, a first interface to receive data, and a second interface to couple the peripheral device to the central processor. The peripheral device prevents data transfers that would cause the central processor to change from a second power management state to a first power management state if the central processor is in the second power management state.

43 Claims, 8 Drawing Sheets

COMPUTER PERIPHERAL DEVICE THAT REMAINS OPERABLE WHEN CENTRAL PROCESSOR OPERATIONS ARE SUSPENDED

FIELD

The present invention relates generally to a method and apparatus to permit a computer system to receive information while the CPU is in a sleeping state, and more particularly to a peripheral device with multiple modes of operation that facilitate receiving and buffering data while the computer's CPU is in a sleeping or suspended state.

BACKGROUND OF THE INVENTION

As mobile computing devices seek to extend time-of-operation between battery charges, power management has become increasingly important. One way in which power management is accomplished is by completely, or partially, shutting down computer components, such as the central processing unit (CPU), hard disk drive, display, and other input/output (I/O) devices, when the computer is not performing operations.

During some of these power management modes, also known as sleeping states, the computer's CPU may cease communications with and control of its peripheral resources, including I/O components, and those resources may not be accessible to any other computer component. Such power management techniques are not unique to any one computer system architecture.

One hardware system specification, the Advanced Configuration and Power Interface (ACPI) Specification, by Intel, Microsoft, and Toshiba, Revision 1.0b, Feb. 2, 1999, provides enhanced power management in a personal computer (PC) system architecture. The ACPI Specification describes the transfer of power management functions from the Basic Input/Output System (BIOS) to the operating system, thereby enabling demand-based peripheral and power management. Through the application of this specification, PC computers manage power usage of peripheral devices such as CD-ROMs, network cards, hard disk drives, codecs, and printers, as well as consumer electronics connected to a PC, such as video cassette recorders, television sets, telephones, and stereos.

ACPI provides several low-power sleeping states, S1–S5, that reduce the power consumed by the platform by limiting the operations it may perform. These sleeping states are described in the table below; S0 has been added as an indicator of the 'active' or 'no sleeping state'. These various operating states are herein referred to as power management states. 'Context', as used in the table below, refers to variable data held by the CPU and other computer devices. It is usually volatile and can be lost when entering or leaving certain sleeping states.

| Sleeping States | Description |
|---|---|
| S0 | Normal operation, active state (no sleeping state). |
| S1 | The S1 sleeping state is a low wake-up latency sleeping state. In this state, no system context is lost (CPU or chip set) and hardware maintains all system context. |
| S2 | The S2 sleeping state is a low wake-up latency sleeping state. This state is similar to the S1 sleeping state except the CPU and system cache context is lost (the OS is responsible for maintaining the caches and CPU context). Control starts from the processor's reset vector after the wake-up event. |
| S3 | The S3 sleeping state is a low wake-up latency sleeping state where all system context is lost except system memory. CPU, cache, and chip set context are lost in this state. Hardware maintains memory context and restores some CPU and L2 configuration context. Control starts from the processor's reset vector after the wake-up event. |
| S4 | The S4 sleeping state is the lowest power, longest wake-up latency sleeping state supported by ACPI. In order to reduce power to a minimum, it is assumed that the hardware platform has powered off all devices. A copy of the platform context is written to the hard disk. |
| S5 | The S5 state is similar to the S4 state except the OS does not save any context nor enable any devices to wake the system. The system is in the "soft" off state and requires a complete boot when awakened. |

In many computing architectures, including the PC computing architecture, data may only be transferred between two peripheral devices by having the host operating system manage such transfer. That is, the processing system or CPU, through one of its auxiliary components, functions as a "master" controlling the data flow to, from, and among peripheral devices which function as "slaves". The "master" is also commonly referred to as the "bus master".

FIG. 1A is a system level diagram of a conventional computing architecture. Generally, the Processing System 100 acts as the "master" by directly or indirectly controlling communications to, from, and among peripheral devices 116,118, and 134. A component, such as the Processing System 100, which acts as the "master" for managing data flow is often also referred to as the "default bus master". The Processing System 100 is typically communicatively coupled to the peripheral devices 116, 118, and 134 via a bus 112. Often, an I/O Hub 130 is employed to couple the bus 112 the one or more peripheral devices 116, 118, and 134 and route data therebetween as indicated by the bi-directional dashed lines. The I/O Hub 130 and the peripheral devices 116, 118, and 134 are usually communicatively coupled by secondary buses 114, 120, and 132.

In most computing architectures, the peripheral devices 116, 118, and 134 cannot operate without the management of the Processing System 100. Thus, while the Processing System 100 is in certain power management states, such as a sleeping or suspended state, the peripheral devices 116, 118, and 134 may not transmit or receive data to or from the Processing System 100 or other peripheral devices.

In another example, FIG. 1B is a prior art, system-level diagram of relevant components of the PC computing architecture. In this architecture, the I/O Controller Hub (ICH) 180 manages communications to and from peripheral devices 166,168, 184 by controlling data flow to the Memory Controller Hub (MCH) 150. The bus between the ICH 180 and MCH 150 is known as the Hub Link bus 162. The MCH 150 may store data received from the ICH 180 in memory (RAM) 160 and the CPU 152 may access such data via the MCH 150.

The ICH 180 communicates with various peripheral devices 166,168,184 and I/O components via standard buses or interfaces. For instance, the computer's hard disk drive (HDD) 168 may be coupled to the ICH 180 via an Integrated Drive Electronics (IDE) or Extended IDE (EIDE) interface 170. "Coupled" as used herein includes electrically coupling two or more components. The ICH 180 may also communicate with an audio codec (AC'97) 166 through the AC'97 Link 164. Other peripheral devices may also be interfaced with the ICH 130 through such interfaces as a Peripheral Component Interconnect (PCI), Universal Serial Bus (USB), RS-232 serial port, or parallel port.

Regardless of the interface or peripheral device, the ICH 180 routes data, indicated by the dashed bi-directional lines, between said interface or device and the MCH 150 as indicated in FIG. 1B. The host computer's operating system (OS) acts as the default Hub Link bus master when the CPU 152 is not in a sleeping state. A number of devices are capable of becoming bus masters, but only the main CPU 152 can serve as the default bus master. When the CPU 152 is in sleeping states S3–S5, the Hub Link bus 162 is not usually operable. That is, while the CPU 152 is in these sleeping states, its resources are often unavailable and communications with the computer and its peripheral devices is not generally possible without awakening the CPU 152. Typically, the ICH 180 is designed with a single Hub Link interface and can handle only one bus master.

One increasingly common peripheral component in mobile computers is a mobile communications device compatible with the Bluetooth Specification, v.1.0B, Dec. 1, 1999. The Bluetooth Specification is a communications standard for wireless communications between mobile PCs, mobile phones, and other portable devices. This standard makes possible the interconnection of a wide range of computing and telecommunications devices via ad hoc, short-range radio links.

Presently, most computers utilize external I/O devices to serve as Bluetooth-compliant transceivers. These devices are often connected to a computer via a Universal Serial Bus (USB) port or some other standard I/O interface. They also rely on the computers' CPU to process the messages received and store them in memory. Therefore, these Bluetooth-compliant transceivers would not be able to operate during those times when the computers' CPU is in a sleeping state. However, keeping the CPU powered just to enable the connectivity of Bluetooth-compliant devices is wasteful of the limited power available to mobile computers.

Accordingly, there is a need for a peripheral device to permit a host system to receive information while the processing system or CPU is in a sleeping state without disturbing the sleeping or suspended state of the processing system or CPU.

DETAILED DESCRIPTION OF THE INVENTION

Figure 1A:
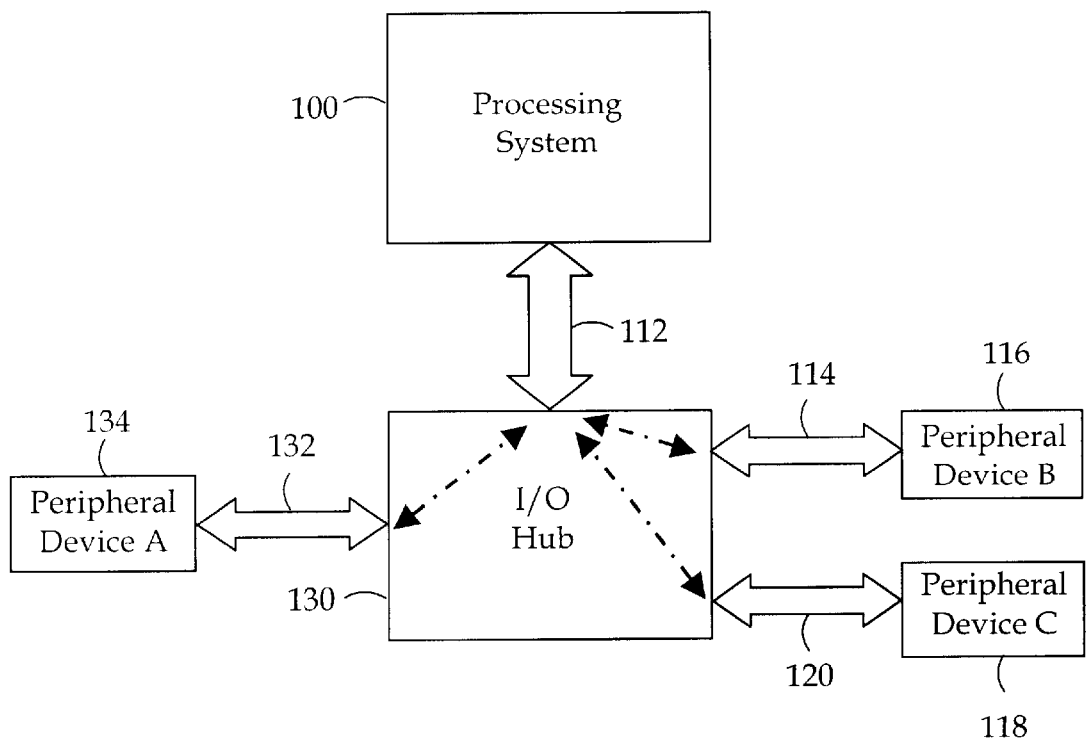
FIG. 1A is a system-level diagram of a conventional computing architecture.
Figure 1B:
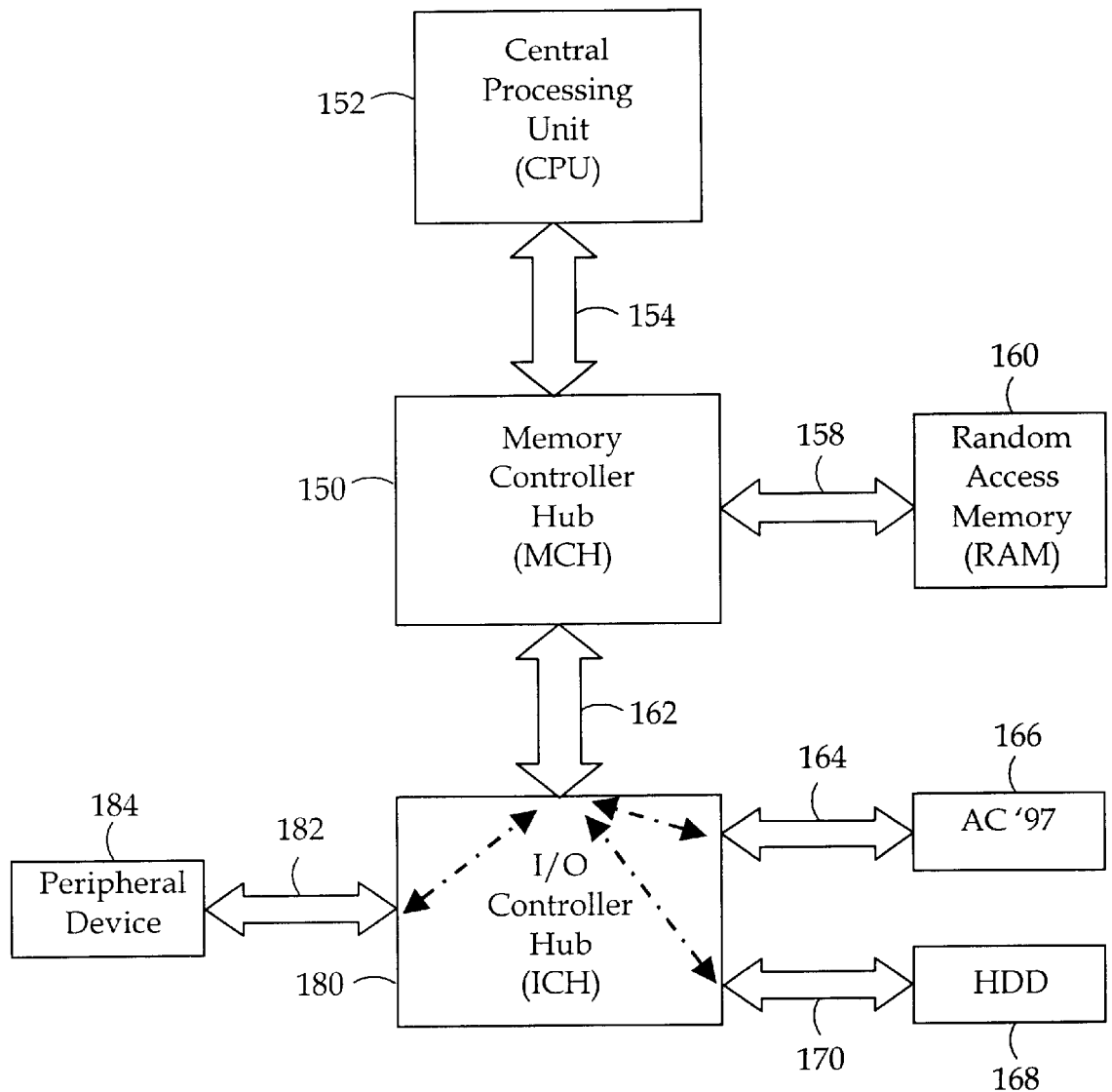
FIG. 1B is a system-level diagram of a conventional PC architecture.
Figure 2A:
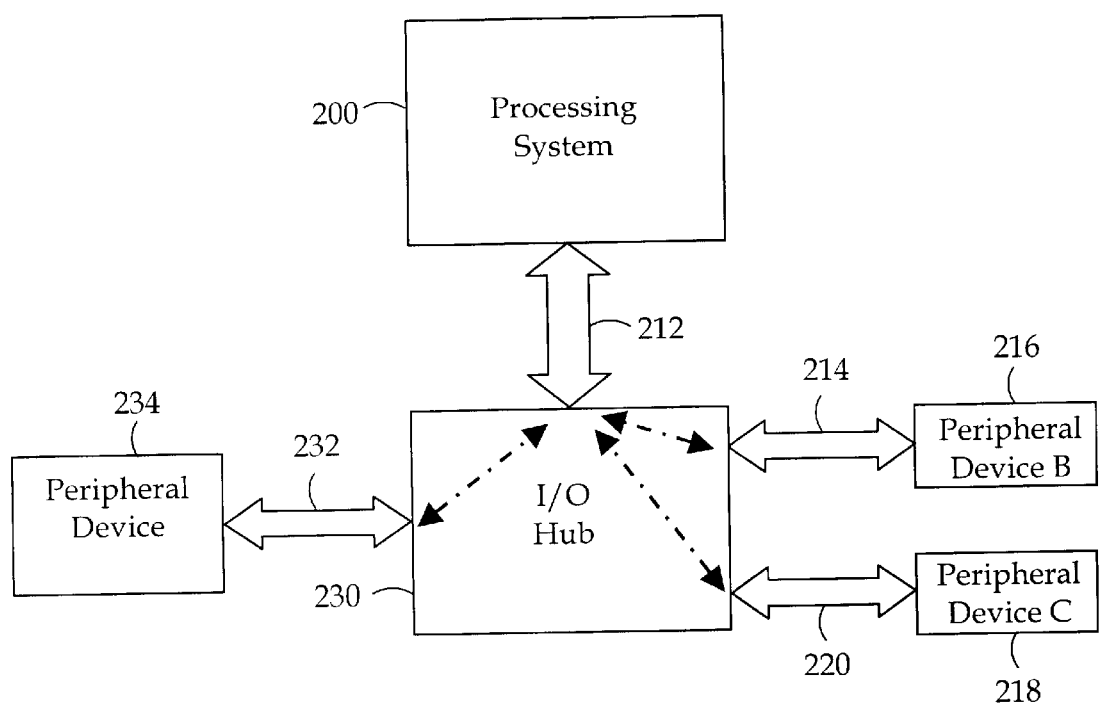
FIG. 2A is a system-level diagram illustrating the data flow between computer system components in a first operating state of the invention.

FIG. 2A shows the data flow between computer system components in a first operating state of the invention. In this embodiment, the present invention provides a Peripheral Device 234 with two or more states of operation which may vary depending on the state of the Processing System 200.

In one embodiment of the present invention, the Processing System 200 is communicatively coupled to the I/O Hub 230 via a Hub bus 212, and functions as the default bus master for the I/O Hub 230 and peripheral devices 216, 218, and 234.

While the Processing System 200 operates as the default bus master, the Peripheral Device 234 operates as a "slave". "Slave" mode is herein defined as a mode of operation in which the Peripheral Device 234 relies on the Processing System's 200 oversight to receive and/or transmit information. While in slave mode, the Peripheral Device 234 behaves as a conventional peripheral device, the Processing System 200 managing communications and/or message routing to the computer and other peripheral devices via the I/O Hub 230. The link 232 may function as any conventional link or bus coupling the Peripheral device 234 to the Processing System 200. In one embodiment, in the first access level the link 232 may be configured to operate at a different transfer rate than the I/O Hub bus 212.

Figure 2B:
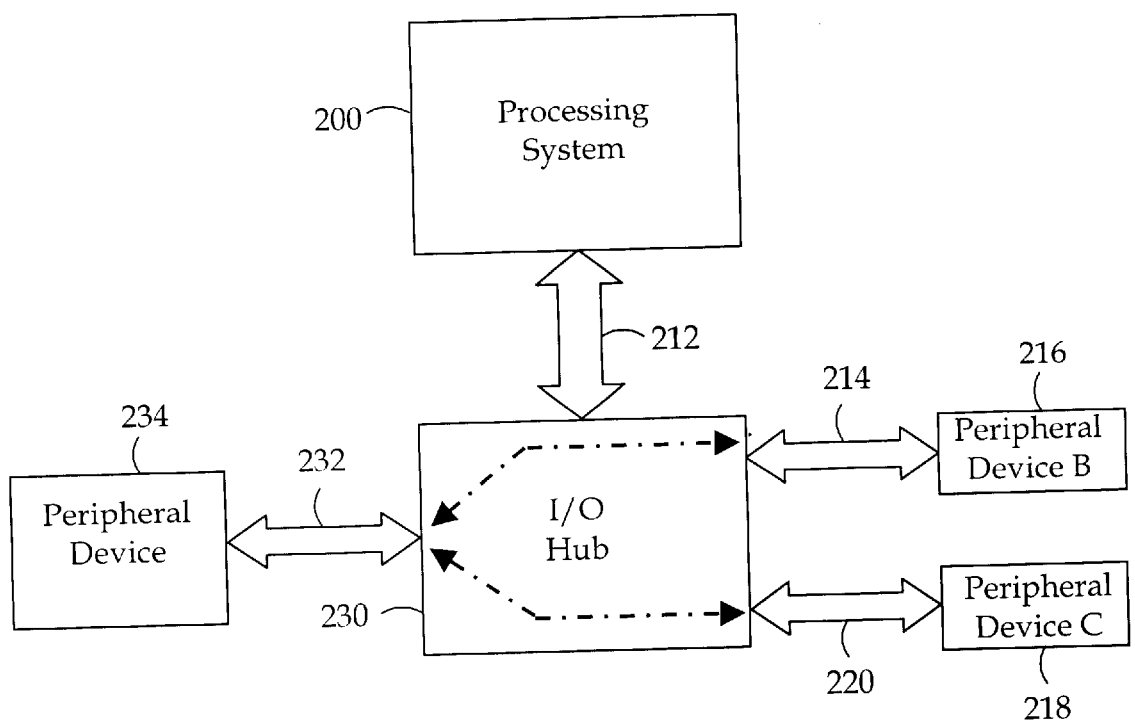
FIG. 2B is a system-level diagram illustrating the data flow between computer system components in a second operating state of the invention.

FIG. 2B shows the data flow between the computer system components in a second operating state of the invention. Typically, when the Processing System 200 is in certain power management states or sleeping states, peripheral devices cannot communicate with the computer or with each other because there is no master to manage communications or route data. However, in the second operating state, the Peripheral Device 234 may function in master mode thereby managing communications over the I/O Hub 230. That is, the Peripheral Device 234 may be reconfigured to operate as an autonomous subsystem.

As an autonomous subsystem, the Peripheral Device 234 may remain powered even when other peripheral devices are put to sleep or into a suspended state. In the second access level, the link 232 may permit a Peripheral Device 234 to manage communications to, from, and among other peripheral devices 216 and 218 via the I/O Hub 230. The Peripheral Device 234 may also receive, transmit, and/or buffer data without the assistance or reliance on the Processing System 200.

In order for the Peripheral Device 234 to operate as the default bus master, the link 232 may be reconfigured for this purpose. Switching between the first and second access levels may entail reconfiguring the interface between the Peripheral Device 234 and link 232, the link 232, the interface between the link 232 and the I/O Hub 230, and/or the I/O Hub 230. This reconfiguration may result in the link 232 operating at a different transmission rate in the second access level than in the first access level.

Typically, I/O hubs are not designed to operate with two default bus masters. However, in one embodiment of the present invention, the I/O Hub 230 may be capable of operating with two alternative default bus masters. To achieve such operation, the I/O Hub 230 may comprise two bus interfaces capable of coupling to devices or components that may operate as default bus masters. At least one of the interfaces may be capable of being dynamically configured between a first and second access level or operating state. The I/O Hub 230 may also be modified to enable the operation of alternative default bus masters.

According to one embodiment of the invention, by monitoring the sleeping states or power management states of the processing system, the Peripheral Device 234 may be capable of changing its operating state from a conventional peripheral device (slave) to operating as the default bus master. As the default bus master, the Peripheral Device 234 may be capable of communicating directly with other peripheral devices 216 and 218.

Figure 3A:
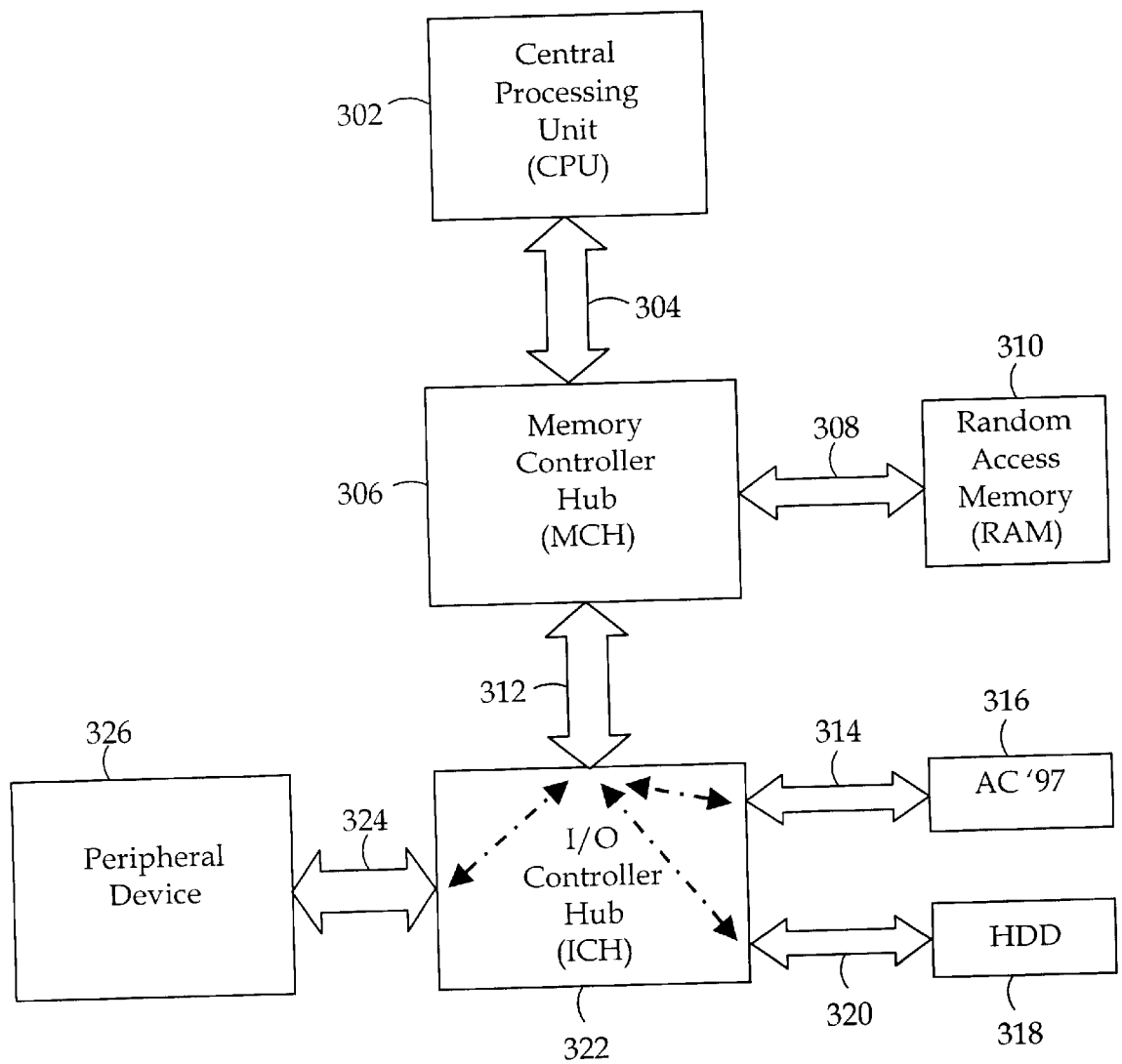
FIG. 3A is a system-level diagram illustrating data flow between PC computer components during normal operation.

FIG. 3A illustrates a portion of a PC computer system architecture. In this embodiment, the present invention provides a configurable link 324 between an ICH 322 and a Peripheral Device 326 which permits two, or more, levels of access depending upon the state of the CPU 302.

In one embodiment of the present invention, the computer's CPU 302 acts as the default bus master for the Hub Link bus 312 and the Peripheral Device 326 is in slave mode. "Slave mode" is herein defined as an operating mode in which the Peripheral Device 326 relies on the CPU's 302 oversight to receive and transmit information. While in slave mode, the Peripheral Device 326 behaves as a conventional peripheral device by communicating with the computer or other peripheral devices by having the ICH 322 route messages to the MCH 306. The ICH 322 and MCH 306 in turn rely on the CPU 302 to manage data flow.

According to one embodiment of the invention, the Peripheral Device 326 is in slave mode if the CPU 302 is in power management states S0–S2 as defined in the ACPI specification.

From the point of view of the host computer, the Peripheral Device 326 may behave as a normal input/output (I/O) device. However, the Peripheral Device 326 is not limited to being an I/O component or peripheral device, it may be any internal or external component capable of operating as described herein. In one embodiment of the present invention, the Peripheral Device 326 may be a component mounted on the same motherboard as the CPU 302.

In one embodiment of the present invention, the Peripheral Device 326 is a wireless communication component which communicates with Bluetooth-compliant devices via a radio-link and interfaces with the host computer via the ICH 322.

Figure 3B:
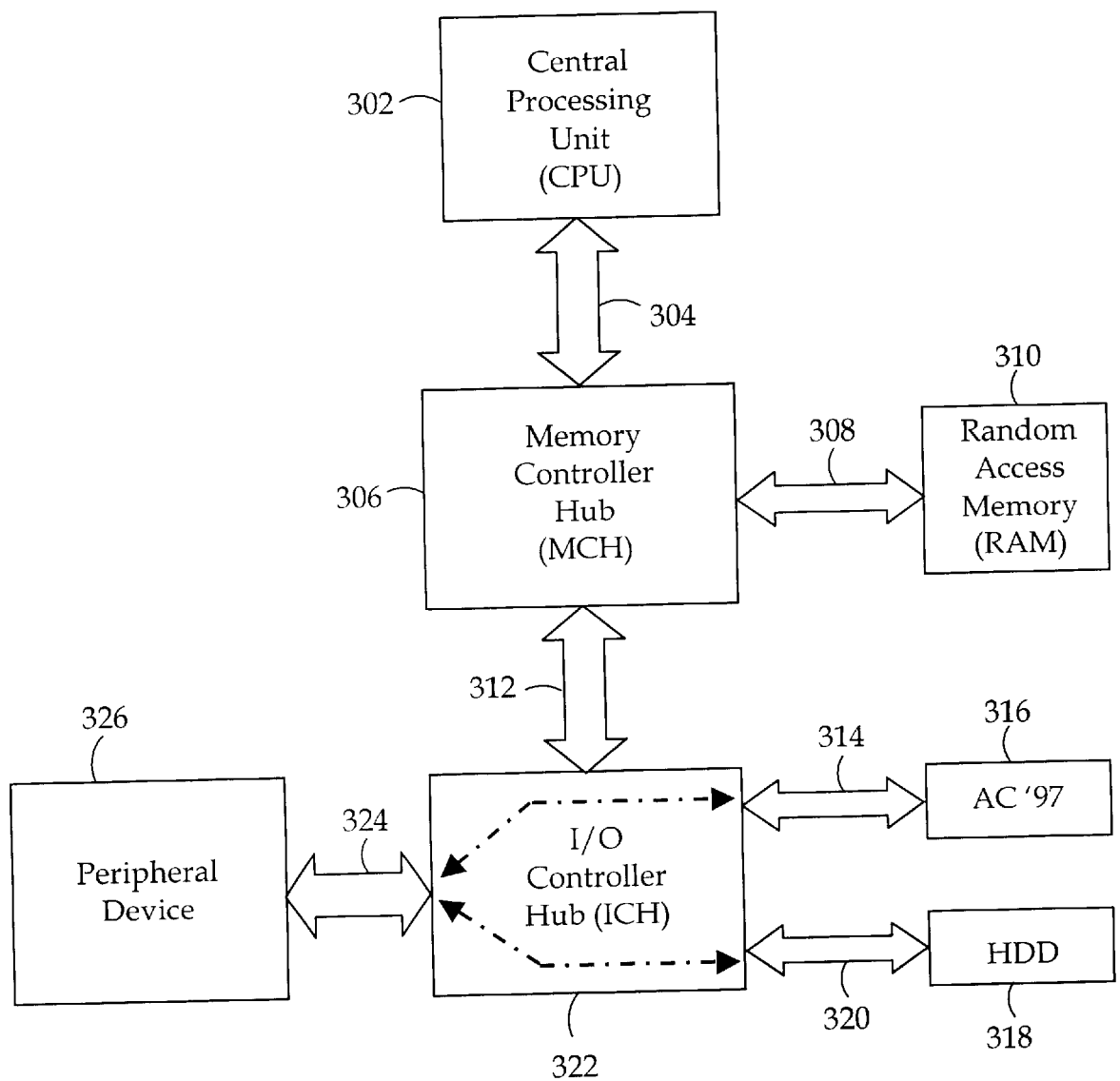
FIG. 3B is a system-level diagram illustrating data flow between a peripheral device and computer components when a PC computer is in a sleeping state.

FIG. 3B illustrates the present invention when the CPU 302 has entered a sleeping state and is unavailable to manage communications over the ICH 322. Typically, when the CPU 302 is in certain sleeping states, peripheral devices cannot communicate with the computer or with each other because there is no master for the first Hub Link bus 312 in order for the ICH 322 to route data. When the ICH 322 is itself placed into certain sleeping states by the CPU 302, it is no longer able to function.

By monitoring the sleeping states or power management states of the CPU 302, the Peripheral Device 326 is capable of operating in master mode and becoming the default Hub Link bus master when the CPU 302 enters certain sleeping states. In master mode, the Peripheral Device 326 may receive, transmit, and/or buffer data without the assistance or reliance on the CPU 302. The Peripheral Device 326 may be an autonomous subsystem which may remain powered even when other peripheral devices are put to sleep or into a suspended state by the CPU 302.

According to one embodiment of the invention, whether or not the Peripheral Device 326 remains On or operates in master mode when the CPU 302 is in a sleeping state, may be a configurable feature. This may be accomplished by the CPU 302, while still awake, configuring the Peripheral Device 326 to prevent it from entering into master mode.

In another embodiment of the present invention, the power management states during which the Peripheral Device 326 is master mode or slave mode may vary. For instance, in one embodiment, the Peripheral Device 326 may be in slave mode during power management states S0–S2, and in master mode during power management states S3–S5, as defined in the ACPI specification. In another embodiment, the Peripheral Device 326 may be in slave mode during power management states S0–S1, and master mode during power management states S2–S5, as defined in the ACPI specification.

The Peripheral Device 326 may detect when the system 302 goes into a power management state in a number of ways. In one embodiment of the present invention the Peripheral Device 326 tests the CPU's 302 control lines or hardware pins to determine when a change in the operating state has occurred. In another embodiment of the present invention, the Peripheral Device 326 may learn of the CPU's 302 change of state by receiving notification of such change from the CPU 302 itself or from a secondary component. According to another embodiment, the Peripheral Device 326 may determine when a change in the operating state has occurred by testing the control lines or hardware of an auxiliary component, such as a chipset component.

Figure 4:
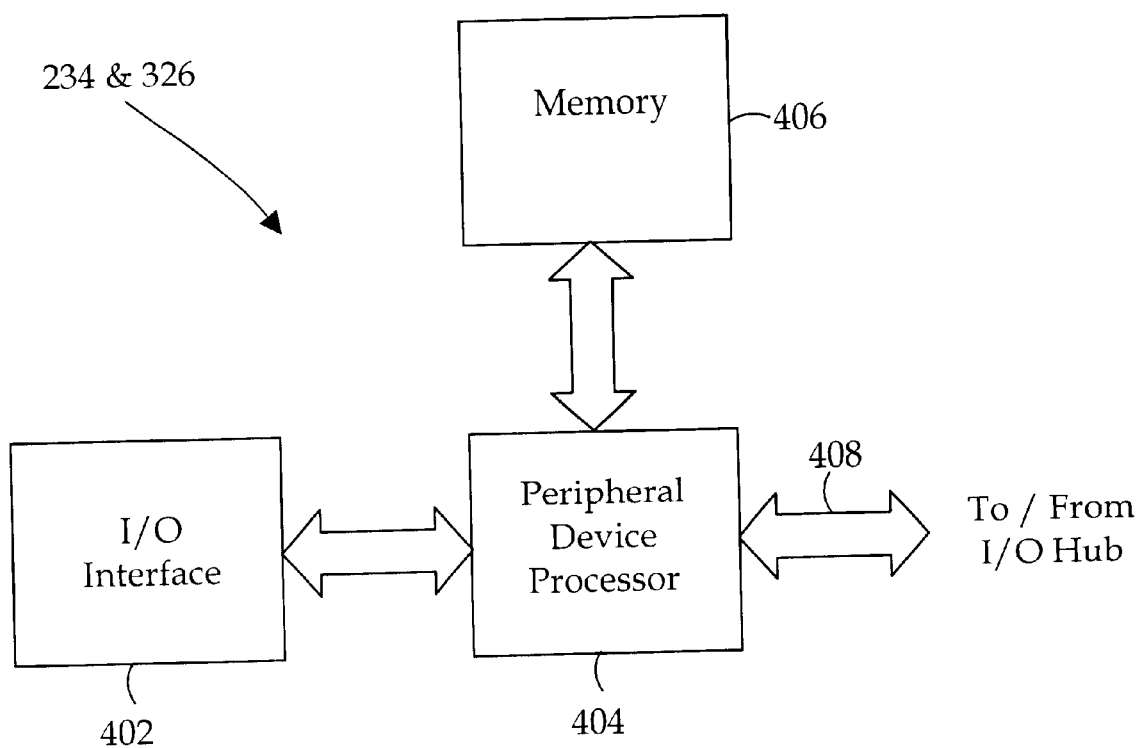
FIG. 4 is a system-level diagram of one embodiment of the peripheral device of the present invention.

FIG. 4 is a system-level view of one embodiment of the Peripheral Device 234 (FIGS. 2A and 2B) and 326 (FIGS. 3A and 3B) according to the present invention. The Peripheral Device 234 (FIGS. 2A and 2B) and 326 (FIGS. 3A and 3B) may include a peripheral processor 404, an I/O interface 402, and memory 406. Peripheral processor 204 may be capable of hosting its own operating system.

In master mode, the Peripheral Device 234 and 326 may be able to receive or transmit data over its I/O interface 402 and store or read data to and from memory 406. In this manner, the Peripheral Device 234 and 326 is able to buffer data destined for the computer and later deliver it to the computer when the processing system 230 (FIGS. 2A and 2B) or CPU 322 (FIGS. 3A and 3B) awakens. The memory component 406 may be either internal to the Peripheral Device 234 and 326 or external to the Peripheral Device 234 and 326. In an embodiment of this invention, the Peripheral Device 234 and 326 may enable direct memory access (DMA) bus mastering between the I/O interface 402 and locally attached memory 406. In one embodiment of the invention, the I/O interface 402 may have a Bluetooth-compliant wireless component coupled to it.

While in master mode, the Peripheral Device 234 and 326 may have the capability to process some of the messages it receives. For instance, it may recognize the sender of a message and, when configured to do so, may alert the user by sending an alert message via the Peripheral Device's I/O interface 402 to another device, such as a Bluetooth-compatible cellular phone. Such configuration may be performed by the user via software running on the host computer when it is awake.

The Peripheral Device 234 and 326 may be capable of reconfiguring its link 408 as a second Hub link bus. The Peripheral Device 234 and 326 is then capable of operating as the default bus master for a second Hub Link bus 408 thereby enabling the I/O Hub to route data. The Peripheral Device 234 and 326 may then communicate directly with other peripheral devices connected to the I/O Hub 230 (FIGS. 2A and 2B) or ICH 322 (FIGS. 3A and 3B) while the processing system 200 (FIGS. 2A and 2B) or CPU 302 (FIGS. 3A and 3B) is in certain sleeping states, such as power management states S3–S5.

The Peripheral Device 234 and 326 may be able to communicate with other peripheral devices 216 and 218 (FIGS. 2A and 2B) such as the HDD 318 or audio codec (AC '97) 316 (FIGS. 3A and 3B) while the processing system 200 or CPU 302 is in a sleeping state. In order for the Peripheral Device 234 and 326 to communicate with other peripheral devices, it may interface to the I/O Hub 234 or ICH 322 via a second bus 232 or 324. In this manner, the Peripheral Device 234 and 326 may operate as the default bus master, allowing DMA bus mastering with the peripheral devices 216 and 218 (FIGS. 2A and 2B), such as AC '97 316 and HDD 318 (FIGS. 3A and 3B), and memory 406. This may require modifying the existing I/O Hub 230 or ICH 322 to be able to handle a second default bus master. However, the I/O Hub 230 or ICH 322 need not be able to accommodate two default bus masters simultaneously.

In one embodiment of the present invention, the Peripheral Device 326 may also be able to communicate with the main memory (RAM) 310 via the MCH 306 (FIGS. 3A and 3B). This may require modifying the existing MCH 306 to be able to operate when the CPU 302 is in certain sleeping states. In this manner, the Peripheral Device 326 may store data on RAM 310.

In one embodiment of the present invention, the Peripheral Device 234 and 326 may receive data over its I/O interface 402 and transfer it to the audio codec (AC '97) 316 (FIGS. 3A and 3B) for processing while the CPU 302 (FIGS. 3A and 3B) is still in a sleeping state. In another embodiment of the invention, the Peripheral Device 326 may receive data and store it in the hard disk drive (HDD) 318 (FIGS. 3A and 3B) while the CPU 302 is in a sleeping state.

The Peripheral Device 234 and 326 may also be able to awaken other peripheral devices 216 and 218 (FIGS. 2A and 2B), such as a hard disk drive 318 or AC '97 316 (FIGS. 3A and 3B), which may have been previously set to a sleeping state by the host computer's CPU 302. Such operation may require an I/O Hub 230 (FIGS. 2A and 2B) or ICH 322 (FIGS. 3A and 3B) that has added functionality to permit the Peripheral Device 234 and 326 to become the default bus master.

The Peripheral Device 234 and 326 may further identify when the processing system 200 (FIGS. 2A and 2B) or CPU 302 (FIGS. 3A and 3B) is in a sleeping state, or returning, exiting, or trying to exit a sleeping state. This may be accomplished in a number of ways. In one embodiment of the present invention, the Peripheral Device 234 and 326 monitors the processing system 200 or CPU 302 to detect its operational state. If the Peripheral Device 234 and 326 is in the middle of an operation when the processing system 200 CPU 302 tries to exit from a sleeping state, it may prevent the processing system 200 or CPU 302 from communicating with peripheral devices until the Peripheral Device 234 and 326 has finished its operation. This may be accomplished by delaying the processing system 200 or CPU 302 from exiting and/or returning from its sleeping state until operations have been completed. In one embodiment of the present invention, the Peripheral Device 234 and 326 may prevent the processing system 200 or CPU 302 from awakening or becoming the default bus master until it has finished its operation by directly operating upon the processing system's 200 or CPU's 302 control lines. In another embodiment of the invention, the Peripheral Device 234 and 326 may delay the processing system 200 or CPU 302 from awakening by acting through a secondary component to cause such delay.

The Peripheral Device 234 and 326 may also have power management states, allowing it to conserve power while in master mode by setting the processing system 200 or CPU 302 to a suspended or sleeping state when not operating. Additionally, the Peripheral Device 234 and 326 may be capable of placing other peripheral devices into a sleeping state. In another embodiment of this invention, the Peripheral Device 234 and 326 may place the I/O component attached to the I/O interface 202 into a sleeping state while the I/O component is not receiving or transmitting.

Figure 5:
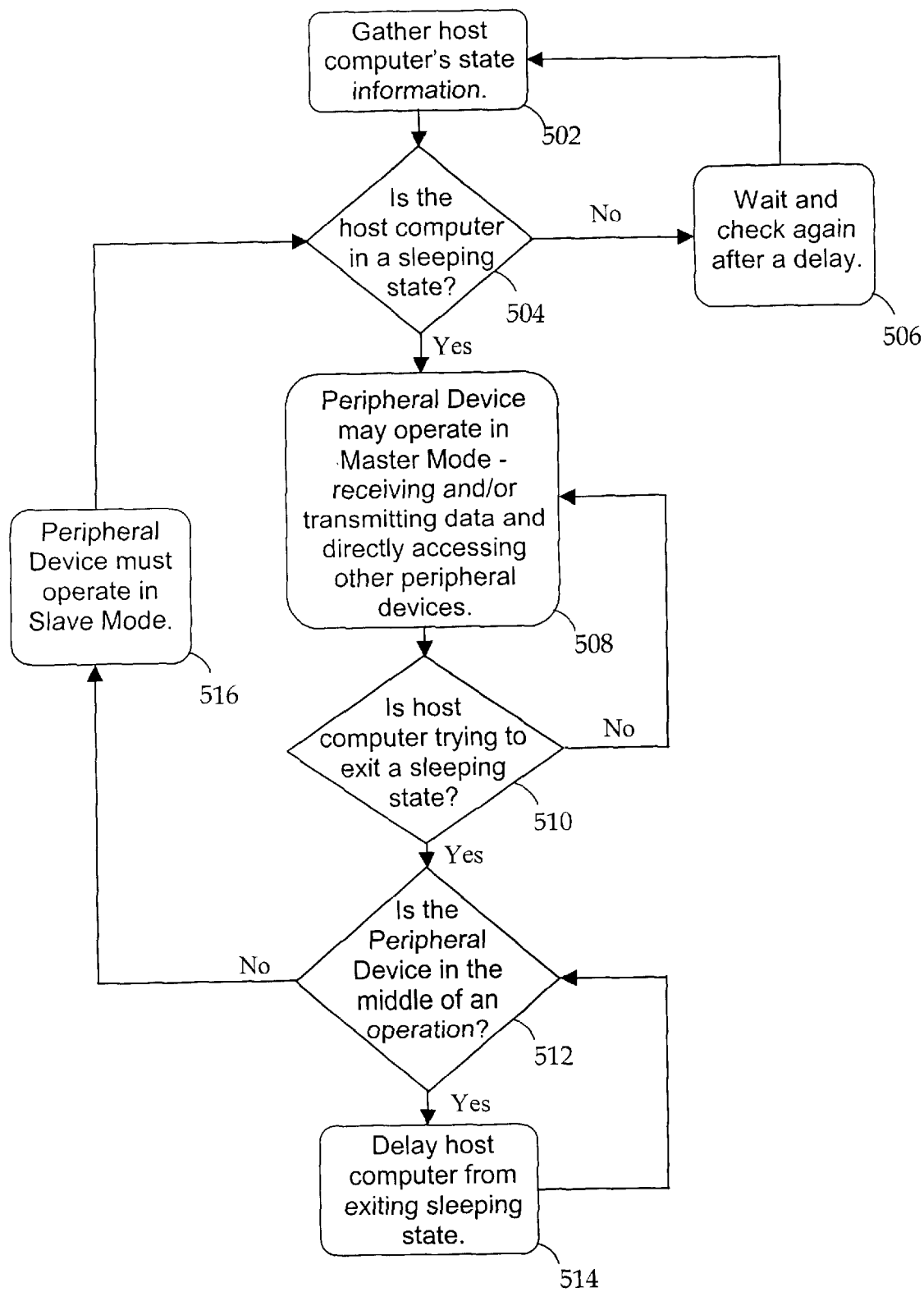
FIG. 5 is a high-level flowchart of the peripheral device's operation.

FIG. 5 is a high-level flowchart of the invention as has been described herein. This flowchart is intended to be exemplary of the way the present invention operates. Variations upon these steps are possible and some have been described above, such as a power management function on the Peripheral Device 234 and 326.

The Peripheral Device 234 and 326, while in slave mode, detects the processing system's or CPU's operating state 402. In one embodiment of the invention, the Peripheral Device monitors the processing system or CPU to determine its power management state. In an alternative embodiment of the present invention, power management state information may be sent to the Peripheral Device by the processing system or CPU or another hardware or software component.

The Peripheral Device will then use the state information to determine if the processing system CPU is in a sleeping state 404. Note that a "sleeping state" is not inclusive of every sleeping state possible. Rather the term may be used to denote a subset of the possible sleeping states, such as ACPI sleeping states S2–S5 for instance. Thus, if the processing system or CPU is in a non-sleeping state, such as S0–S2 for instance, then the Peripheral Device will continue to operate as a normal I/O device until such time as the processing system or CPU enters into a sleeping state, such as S3–S5.

When the processing system enters a sleeping state, the Peripheral Device may change to master mode 408. In master mode, the Peripheral Device may receive and/or transmit data and store or buffer it in memory as described above. The Peripheral Device may also be able to directly access other peripheral devices as described above.

While the Peripheral Device operates in master mode, it can continue to monitor or detect the processing system's or CPU's operating state. In one embodiment, it may determine whether or not the processing system or CPU is trying to exit a sleeping state 410. In another embodiment, it may determine whether or not the processing system or CPU continues to be in a sleeping state. If the processing system or CPU remains in a sleeping state, the Peripheral Device may continue to operate in master mode.

If the processing system is awakening from its sleeping state, the Peripheral Device can determine if it is in the middle of an operation 412, such as reading or writing to another peripheral device. If it is not in the middle of such operation, it can return to slave mode 416 and the processing system or CPU can awaken. However, if the Peripheral Device is in the middle of an operation, it may delay the processing system or CPU from awakening 414 until it has time to finish its operation. When the Peripheral Device has finished, it can then return to slave mode 416 and the processing system or CPU can awaken.

A person of ordinary skill in the art will recognize that the present invention may be practiced on computer architectures other than the ones described herein. Additionally, the invention herein described may take the form of machine-readable instructions within the Peripheral Device. The instructions may be stored in any number of memory storage component or program stores, such as read-only memory modules.

While the preferred embodiment describes the Peripheral Device as a device that may be mounted on the same motherboard as the host computer's processing system or CPU, the Peripheral Device may also be an external component not mounted on the motherboard.

The ACPI power management states herein employed, S0–S5, are not a limitation on the present invention. Other states of operation, not limited to the power management states herein described, may be used to define the master and slave modes of operation for the Peripheral Device without altering the nature of the invention.

While the invention has been described and illustrated in detail, it is to be clearly understood that this is intended by way of illustration and example only and is not to be taken by way of limitation, the spirit and scope of this invention being limited only by the terms of the following claims.

What is claimed is:

1. A peripheral device, comprising:
   a first interface to receive data;
   a second interface to couple the peripheral device to a central processor; and
   a circuit to detect the power management state of the central processor and prevent the peripheral device from initiating data transfers that would cause the central processor to change from a second power management state to a first power management state if the central processor is in the second power management state.

2. The peripheral device of claim 1, wherein the peripheral device can initiate data transfers to the central processor if the central processor is in the first power management state.

3. The peripheral device of claim 1, wherein the second power management state includes power modes S3–S5 as defined in the Advanced Configuration and Power Interface (ACPI) specification.

4. The peripheral device of claim 1, wherein the peripheral device buffers the data received if the central processor is in the second power management state, and later delivers the buffered data received to the central processor when the central processor is in the first power management state.

5. The peripheral device of claim 4, further comprising:
   a memory storage device coupled to the peripheral device to buffer the data received.

6. The peripheral device of claim 1, wherein the first power management state and the second power management state each comprises a set of power management states.

7. A computer system comprising:
   a central processor; and
   a first peripheral device having
      a first interface to receive data,
      a second interface to couple the first peripheral device to the central processor, and
      a circuit to detect the power management state of the central processor and prevent the first peripheral device from initiating data transfers that would cause the central processor to change from the second power management state to the first power management state if the central processor is in the second power management state.

8. The computer system of claim 7, wherein the first peripheral device to initiate data transfers if the central processor is in a first power management state.

9. The computer system of claim 7, wherein the second power management state includes power management states S3–S5 as defined in the Advanced Configuration and Power Interface (ACPI) specification.

10. The computer system of claim 7, further comprising:
    a memory controller hub coupled to the central processor; and
    an input/output controller hub coupled to the memory controller hub and to the second interface of the first peripheral device.

11. The computer system of claim 10, wherein the first peripheral device becomes a default bus master for the input/output controller hub if the central processor is in the second power management state.

12. The computer system of claim 10, further comprising:
    a second peripheral device coupled to the input/output controller hub, the first peripheral device to communicate directly with the second peripheral device through the input/output controller hub if the central processor is in the second power management state.

13. The computer system of claim 12, wherein the first peripheral device can delay the central processor from transitioning from the first power management state to the second power management state.

14. The computer system of claim 7, wherein the first peripheral device can delay the central processor from transitioning from the second power management state to the first power management state.

15. A system, comprising:
    a sub-system to detect the power management state of a central processor;
    a sub-system to determine whether the central processor is in a first power management state or a second power management state;
    a sub-system to receive data; and
    a sub-system to prevent data transfers that would cause the central processor to change from the second power management state to the first power management state if the central processor is in the second power management state.

16. The system of claim 15, further comprising:
    a sub-system to initiate a data transfer if the central processor is in the first power management state.

17. The system of claim 15, further comprising:
    a sub-system to buffer data if the central processor is in the second power management state, and later deliver the buffered data to the central processor when the central processor is in the first power management state.

18. The system of claim 15, further comprising:
    a sub-system to directly access and communicate with a second peripheral device without assistance from the central processor.

19. The system of claim 15, further comprising:
    a sub-system to delay the central processor from transitioning from the second power management state to the first power management state.

20. A method comprising:
    detecting the power management state of a central processor;
    determining whether the central processor is in a first power management state or a second power management state;
    receiving data; and
    preventing data transfers that would cause the central processor to change from the second power management state to the first power management state if the central processor is in the second power management state.

21. The method of claim 20, further comprising:
transferring the data to the central processor if the central processor is in the first power management state.

22. The method of claim 20, wherein determining whether the central processor is in a first power management state or a second power management state occurs before receiving data.

23. The method of claim 20, wherein determining whether the central processor is in a first power management state or a second power management state occurs immediately before starting or preventing a data transfer.

24. The method of claim 20, wherein preventing data transfers further comprises delaying a data transfer by buffering the received data in a local memory of the first peripheral device if the central processor is in the second power management state, and later delivering the buffered data to the central processor when the central processor is in the first power management state.

25. The method of claim 24, further comprising:
delaying the ventral processor from exiting the second power management state if the first peripheral device is buffering data.

26. The method of claim 20, wherein preventing the data transfer further comprises transferring the received data from the first peripheral device to a second peripheral device.

27. The method of claim 26, further comprising:
delaying the central processor from exiting the second power management state if the first peripheral device is communicating with the second peripheral device.

28. The method of claim 20, wherein the first power management state and the second power management state each comprises a set of power management states.

29. A machine-readable medium that provides instructions, which when executed by a processor, causes the processor to perform operations comprising:
detecting the power management state of a central processor;
determining whether the central processor is in a first power management state or a second power management state;
receiving data; and
preventing data transfers that would cause the central processor to change from the second power management state to the first power management state if the central processor is in the second power management state.

30. The machine-readable medium of claim 29, further comprising:
initiating a data transfer if the central processor is in the first power management state.

31. The machine-readable medium of claim 29, wherein determining whether the central processor is in a first power management state or a second power management state occurs immediately before starting or preventing a data transfer.

32. The machine-readable medium of claim 29, wherein preventing data transfers further comprises delaying a data transfer by buttering the received data in a local memory of the first peripheral device if the central processor is in the second power management state, and later delivering the buffered data to the central processor when the central processor is in the first power management state.

33. The machine-readable medium of claim 29, further providing instructions comprising:
delaying the central processor from exiting the second power management state if the first peripheral device is buffering data.

34. The machine-readable medium of claim 29, wherein preventing the data transfer further comprises transferring the received data from the first peripheral device to a second peripheral device.

35. The machine-readable medium of claim 29 further providing instructions comprising:
delaying the central processor from exiting the second power management state if the first peripheral device is communicating with the second peripheral device.

36. A first peripheral device, comprising:
a first interface to receive data;
a second interface to couple the first peripheral device to a central processor; and
a peripheral processor coupled to a program store containing machine-readable instructions which, when executed by the peripheral processor, causes the processor to
detect the power management state of a central processor,
determine whether the central processor is in a first power management state or a second power management state, and
preventing data transfers that would cause the central processor to change from the second power management state to the first power management state if the central processor is in the second power management state.

37. The first peripheral device of claim 36, wherein the machine-readable instructions initiate a data transfer if the central processor is in the first power management state.

38. The first peripheral device of claim 36, wherein the machine-readable instructions are found within a read-only memory component.

39. The first peripheral device of claim 36, wherein the machine-readable instructions prevent the data transfer by buffering the received data in a local memory of the first peripheral device if the central processor is in the second power management state, and later delivering the buffered data to the central processor when the central processor is in the first power management state.

40. The first peripheral device of claim 36, wherein the machine-readable instructions delay the central processor from exiting the second power management state if the first peripheral device is buffering data.

41. The first peripheral device of claim 36, wherein the machine-readable instructions configure the first peripheral device to perform as a default bus master.

42. The first peripheral device of claim 36, wherein the machine-readable instructions delay the data transfer by transferring the received data from the first peripheral device to a second peripheral device.

43. The first peripheral device of claim 36, wherein the machine-readable instructions delay the central processor from exiting the second power management state if the first peripheral device is communicating with a second peripheral device.

* * * * *

UNITED STATES PATENT AND TRADEMARK OFFICE
CERTIFICATE OF CORRECTION

PATENT NO. : 6,748,548 B2
DATED : June 8, 2004
INVENTOR(S) : Bormann et al.

It is certified that error appears in the above-identified patent and that said Letters Patent is hereby corrected as shown below:

<u>Column 11,</u>
Line 23, delete "ventral" and insert -- central --.
Line 62, delete "buttering" and insert -- buffering --.

Signed and Sealed this

Thirty-first Day of August, 2004

JON W. DUDAS
*Director of the United States Patent and Trademark Office*